United States Patent Office 3,299,102
Patented Jan. 17, 1967

3,299,102
LOWER 9-ALKYL SUBSTITUTED TRICYCLO-DECENE-9 CARBOXYLIC ACID DIANHYDRIDES
Jerald S. Bradshaw, Richmond, Calif., assignor to Chevron Research Company, San Francisco, Calif., a corporation of Delaware
No Drawing. Filed Oct. 12, 1965, Ser. No. 495,307
3 Claims. (Cl. 260—346.3)

This invention relates to certain novel 9-alkyl substituted tricyclo-dec-9-ene carboxylic dianhydrides. More particularly it relates to compounds of the formula

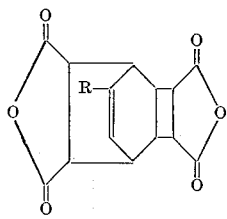

in which R is an alkyl group having from 2 to 6 carbon atoms, respectively.

For example R can be ethyl, n-propyl, i-propyl, i-butyl, t-butyl, n-butyl, s-butyl, n-pentyl, 2-pentyl, 3-pentyl, neopentyl, and the analogous hexyl groups.

Generally, the dianhydrides of the present invention can be prepared in satisfactory yields by a photoinitiated reaction between maleic anhydride and monoalkyl benzene hydrocarbons in which the alkyl group of the benzene corresponds to R of the desired dianhydride of the above formula. A mixture of maleic anhydride and the desired alkylbenzene is maintained in the liquid phase while being irradiated by actinic light having an appreciable amount of its energy, i.e., at least 1% in the 2000–4000 A. range. Improved quantum yields are obtainable when an aryl ketone such as acetophenone is added to the reaction mixture. The desired dianhydride is usually recoverable in the form of microcrystals by filtration of the resulting reaction product mixture.

The subject anhydrides are particularly useful in the curing of 1,2 epoxy resins containing an average of more than one epoxy group per resin molecule of the phenol-derived-type. In this use a mixture of from about 0.2 to 1 mol of the anhydride per mol of the epoxy resin is heated and cured. During the curing clear bubble free liquid melts are obtainable. The cured hardened resins are also obtainable free of the bubbles and hence from strong useful castings.

The resins for which the subject dianhydrides are excellent curing agents are also known as glycidyl epoxy resins and are well known in the art, as by such various trade names as Epon, Araldite, Epi-Rez and others. A typical preparation of these resins is by an alkali promoted reaction between epichlorohydrin and a dihydroxy bisphenolic compound such as 2,2-bis-(4-hydroxyphenyl)-propane. The resulting product can vary in molecular weight depending upon the reaction conditions having at least one each of the individual reactants condensed therein on up to as much as 10 and higher of each.

The following examples illustrate the preparation of the novel dianhydrides of the invention.

EXAMPLES 1–3

Tricyclo-9-alkyl-decene-9-tetracarboxyl acid dianhydrides were individually prepared using maleic anhydride and the following alkylbenzenes: ethylbenzene, cumene and t-butylbenzene. In the reactions 5 grams (0.05 mol) of maleic anhydride, 5 ml. of acetophenone and 50 mls. (0.3–0.4 mol) of the alkylbenzene were placed in a large Pyrex test tube or flask and the resulting solution irradiated by a 450-watt Hanovia lamp (mercury arc) for 18 hours at about room temperature (ca. 22° C.).

The reaction products were crystalline solids which were collected in good yields by filtration and washed with about 100–150 mls. of dry ether. The product melting points and equivalent weights (Table I) were found to be as follows:

Table I.—Maleic anhydride-alkylbenzene photoadducts

| Alkylbenzene | MP,[1] ° C. | Equivalent Weight | |
| --- | --- | --- | --- |
| | | Calculated | Found |
| Ethylbenzene | 250–255 | 75.5 | 74.5 |
| Cumene | 250–255 | 79.1 | 79.3 |
| t-Butylbenzene | 245–250 | 82.6 | 83.1 |

[1] Crude ether washed product.

TETRAMETHYL ESTERS

Aliquots of the dianhydrides were added to methanol saturated with hydrogen chloride gas and the corresponding tetramethyl esters (Table II) prepared and recovered by conventional means. The following characterizing data were obtained.

Table II.—Methyl esters of the alkylbenzene-maleic anhydride adducts

| Alkylbenzene | MP, ° C. | Analyses | | | |
| --- | --- | --- | --- | --- | --- |
| | | Calculated | | Found | |
| | | C | H | C | H |
| Ethylbenzene | 100–102 | 60.90 | 6.64 | 60.93 | 6.71 |
| Cumene | 107–108 | 61.75 | 6.91 | 61.66 | 6.79 |
| t-Butylbenzene | 87–88 | 62.55 | 7.16 | 62.60 | 7.02 |

TETRACARBOXYLIC ACIDS

The cumene adduct was converted to the corresponding tetracarboxylic acid by refluxing 10–12 grams of the anhydride adduct in 125 ml. of 1.5 M potassium hydroxide solution for 4 hours. The cooled solution was filtered and acidified with hydrochloric acid, yielding solid. The solid was separated, recrystallized from water, and dried. The equivalent weight was found to be 88.3 (calculated value is 88.1).

The infrared spectra of the subject dianhydrides were substantially identical in all of the essential details, differing only in adsorption in the 1400–1500 cm.$^{-1}$ region depending upon the particular alkyl substituent. The spectra for the cumene-maleic anhydride, which is representative (figure), follows.

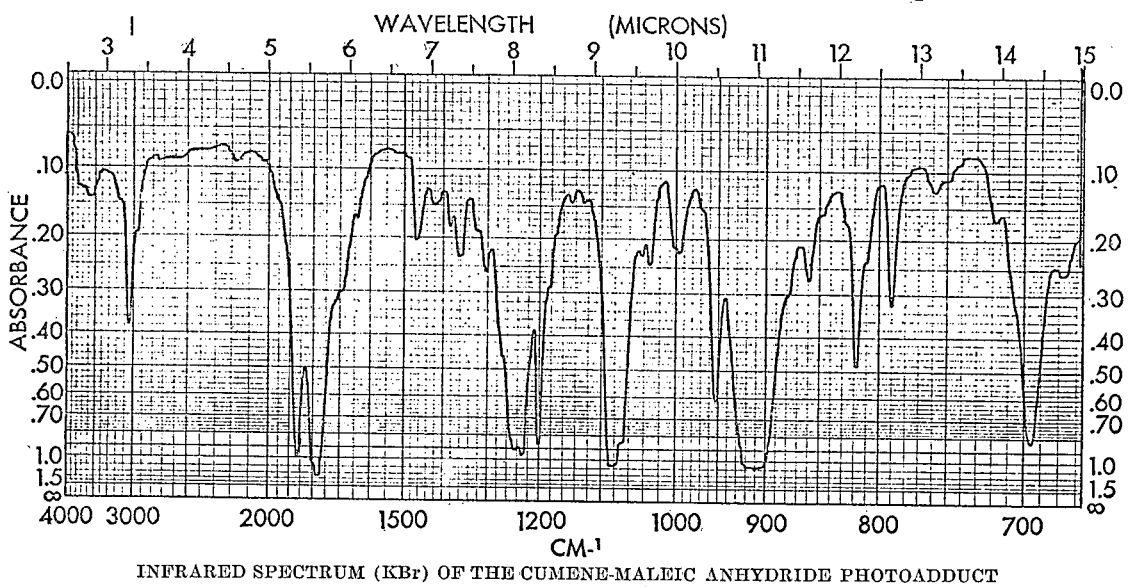

INFRARED SPECTRUM (KBr) OF THE CUMENE-MALEIC ANHYDRIDE PHOTOADDUCT

NUCLEAR MAGNETIC RESONANCE SPECTRA

The spectra (Table III) were determined for the tetramethyl esters as follows:

Table III

| Alkyl Group | δ (Proton Area)[1] |
|---|---|
| Ethyl | 6.2 m (1), 3.7 d (12), 3.0 m (8), 2.4 q (2), 1.3 t (3) |
| Cumene | 6.0 m (1), 3.55 d (12), 2.8 m (8), 2.3 m (1), 1.1 d (6) |
| t-Butyl | 6.1 m (1), 3.5 d (12), 2.8 m (8), 1.1 s (9) |

[1] s = singlet; d = doublet; t = triplet; q = quartet; m = multiplet.

HARDENING OF EPOXY RESINS

A commercial resin made from Bisphenol-A and epichlorohydrin having an epoxy equivalent weight of 173–179 (Dow Chemical Co. DER 332), was hardened using representative dianhydrides of the subject invention. The epoxy castings were prepared by dissolving 0.4 equivalent of the photoadduct in 1 equivalent of the epoxy. When completely dissolved, 0.4 equivalent of phthalic anhydride was added. The resulting liquid was poured between casting frames and cured at 160° C. for 24 hours. The test results are given in Table IV.

Table IV.—Properties of DER 332 cured with EBMA[1] and CMA[1]

| | EBMA[1] | CMA[1] |
|---|---|---|
| Anhydrides: | | |
| Barcol Strength | 40 | 35 |
| Heat Distortion, °F | 230 | 210 |
| Flexural Strength, p.s.i. | 18,000 | 19,000 |
| Flexural Modulus, p.s.i. $\times 10^{-5}$ | 4.9 | 5.5 |
| Impact Strength,[2] ft.-lb./in | 3.3 | 3.3 |

[1] EBMA—Ethylbenzene-maleic anhydride photoadduct; CMA—Cumene-maleic anhydride photoadduct.
[2] Izod unnotched.

The foregoing data demonstrates that the dianhydrides of the instant invention are effective epoxy resin hardening agents.

The tetramethyl esters and the corresponding tetracarboxylic acids obtained from the subject tricyclodecene dianhydrides are useful cross linking agents in the preparation of polymers and resins.

I claim:
1. A compound of the formula

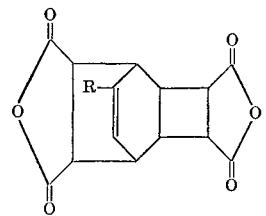

wherein R is an alkyl group having from 2 to 6 carbon atoms, respectively.

2. A compound of the formula

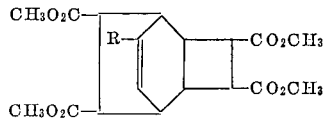

wherein R is an alkyl group having from 2 to 6 carbon atoms, respectively.

3. A compound of the formula

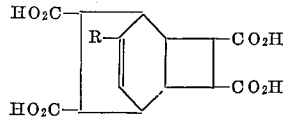

wherein R is an alkyl group having from 2 to 6 carbon atoms, respectively.

References Cited by the Examiner

UNITED STATES PATENTS 3,037,966   6/1962   Chow et al. _____ 260—346.3
3,125,585   3/1964   Yates _____ 260—346.3

References Cited by the Applicant

FOREIGN PATENTS 986,348   3/1965   Great Britain.

OTHER REFERENCES

H. J. F. Angus and D. Bryce-Smith: Proc. Chem. Soc., 326 (1959).

E. Grovenstein, D. V. Rao, and J. W. Taylor: J. Am. Chem. Soc., 83, 1705 (1961).

G. S. Hammond and W. M. Hardham: Proc. Chem. Soc., 63 (1963).

NICHOLAS S. RIZZO, *Primary Examiner*.